Figure 1:
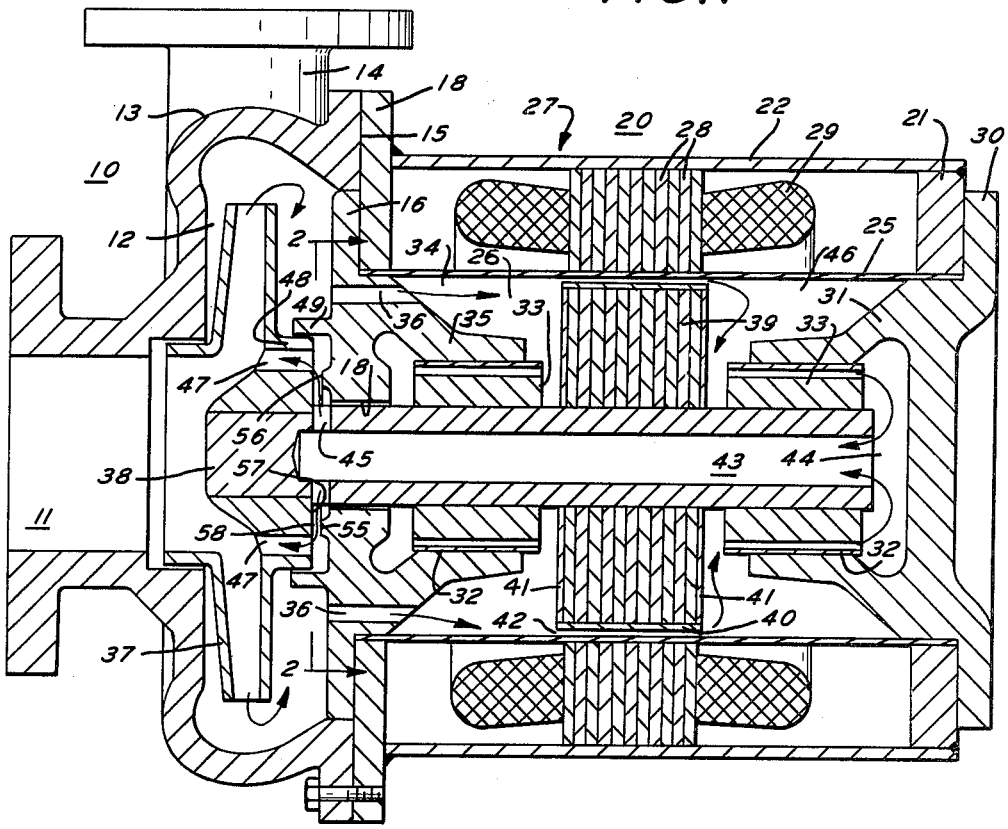

Nov. 30, 1965  H. T. WHITE  3,220,349
MOTOR DRIVEN PUMP
Filed Sept. 9, 1964

INVENTOR
HOWARD T. WHITE

BY
ATTORNEY

United States Patent Office 3,220,349
Patented Nov. 30, 1965

3,220,349
MOTOR DRIVEN PUMP
Howard T. White, Upper Moreland Township, Montgomery County, Pa., assignor, by mesne assignments, to Crane Co., New York, N.Y., a corporation of Illinois
Filed Sept. 9, 1964, Ser. No. 395,136
7 Claims. (Cl. 103—87)

This invention relates to motor driven pumps.

It has heretofore been proposed to provide a pressure balancing chamber for a pump impeller to control the axial positioning of the impeller. One such arrangement is shown in my prior Patent No. 3,053,189.

It has also heretofore been proposed as in my prior Patent No. 3,138,105 to provide a pressure balancing chamber bounded by a fixed orifice provided between the periphery of an enclosed or "canned" motor rotor and a motor stator isolating sleeve and by a variable orifice at the end of the motor shaft remote from the impeller.

In my prior application, Serial No. 372,260, filed June 3, 1964, a fixed orifice is provided along part of the periphery of the motor rotor and a variable orifice is provided at at least one end of the motor rotor, with a balancing chamber at at least one end of the motor rotor.

The apparatus of the present invention provides an improved pressure balancing arrangement for an impeller and motor rotor assembly which is particularly suitable for but is not limited to large pumps.

It is the principal object of the present invention to provide a motor driven pump having pressure balancing or positioning of the motor rotor and impeller which is effected by the circulation of fluid through the interior of the motor rotor and the application of balancing forces on the motor rotor.

It is a further object of the present invention to provide a motor driven pump having improved structure for balancing axial thrust in which the motor rotor and impeller shaft have a fixed orifice at a predetermined location and preferably between the periphery of the motor rotor and the stator isolating sleeve, and a variable orifice between the impeller and a fixed part of the impeller enclosure, and accordingly perpendicular to the shaft.

It is a further object of the present invention to provide a motor driven pump having improved structure for balancing axial thrust which permits of reduction or elimination of wearing rings heretofore considered essential to accommodate axial thrust.

It is a further object of the invention to provide a motor driven pump having improved structure for fluid pressure balancing of axial thrust which in and of itself supplies sufficient fluid flow for cooling and lubrication.

It is a further object of the present invention to provide a motor driven pump having an improved arrangement for fluid circulation for axial balancing and which by increasing the fluid pressure in the motor rotor chamber, increases the stability of the cooling.

Other objects and advantageous features of the invention will be apparent from the description and claims.

Figure 2:
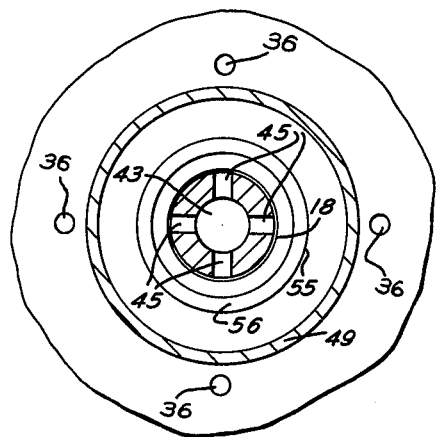

The nature and characteristic features of the invention will be more readily understood from the following description taken in connection with the accompanying drawings forming part thereof, in which:

FIGURE 1 is a vertical longitudinal central sectional view of a motor driven pump provided with provisions for balancing in accordance with the invention, parts being shown diagrammatically; and FIG. 2 is a transverse vertical sectional view taken approximately on the line 2—2 of FIG. 1.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings, in which a preferred embodiment of the invention is illustrated, an impeller housing 10 is provided having a longitudinal axial centrally disposed fluid inlet connection 11 in communication with an interior fluid space or impeller chamber 12. The fluid space 12 is enclosed within a scroll 13 of well known type. The impeller housing 10 has a fluid delivery connection 14 formed thereon and in communication with the interior of the scroll 13, for delivery of the fluid being pumped.

The impeller housing 10 has an end face 15 with a liner plate 16 aligned therewith. A motor housing end plate 18 is provided to which the liner plate 16 can be secured in any desired manner. The liner plate 16 has a shaft receiving bore 19. The impeller housing 10 is also secured to the end plate 18 in a well known manner.

The end plate 18 is preferably part of a motor housing 20 which has an end plate 21 at the opposite end and a cylindrical housing member 22 connecting the end plates 18 and 21.

The end plates 18 and 21 have extending therebetween a cylindrical sleeve 25 of any desired material which is nonmagnetic responsive and which is resistant to corrosion by the liquid being pumped. For a number of types of installations the sleeve 25 can advantageously be of stainless steel. The sleeve 25 is secured at its ends in fluid tight relation in any desired manner, such as by linear welding, to the end plates 18 and 21. The sleeve 25, with the housing 20, provides an isolated motor stator chamber 26 within which the motor stator 27 of an alternating current motor is disposed. The stator 27 includes stator laminations 28 and windings 29 and energizing conductors (not shown).

An end closure plate 30 is provided mounted on and secured to the end plate 21 and has an inwardly extending portion or boss 31 extending within the sleeve 25 in fluid tight relation. The end plate portion 31 has a bearing retaining ring 32 mounted therein within which a bearing ring 33 of carbon or of any other desired type is carried, such for example as that shown in my prior Patent No. 2,741,990 and which permits fluid flow therealong. The liner plate 17 preferably also has an inwardly disposed boss portion 35 extending within the sleeve 25, and preferably in fluid tight relation and within which a bearing retainer ring 32 and bearing 33 is mounted. A motor rotor chamber 34 is thus provided within the sleeve 25 and between the boss portions 31 and 35 and communication is established between opposite sides thereof by ports or openings 36. The openings 36 permit limited fluid flow from the interior of the scroll 13 to the motor rotor chamber 34.

A fluid impeller 37 disposed within the scroll 13, is carried on a shaft 38 which is journaled in the bearings 33, and has a motor rotor 39 secured thereto inwardly of the motor stator 27. The motor rotor 39 can be of any desired type but is preferably of the short circuited type and enclosed within an outer fluid tight casing, having a peripheral enclosure 40 and end cover plates 41, as shown in my prior Patent No. 3,111,090. The peripheral enclosure 40 and end cover plates 41 provide what is known as a "canned" rotor. The structure heretofore described is conventional and well known and has formed the basis for the design and construction of many motor driven pumps.

The length of the peripheral enclosure 40 is constant and the clearance between the peripheral enclosure 40 and the sleeve 25 provides a fixed or constant orifice 42 for purposes to be explained.

In accordance with the present invention the shaft 38 is provided with an interior axially extending passageway 43 communicating with a chamber 44 in the end closure plate 30 and near the opposite end has one or more radial passageways 45 for fluid flow. The liner plate 16 is provided with an annular rim 55 having a flat face 56 for longitudinal axial movement with respect thereto of a back face 57 of the impeller 37 to provide a variable orifice 58.

The location of the fixed orifice 43 and the variable orifice 58 defines part of the motor rotor chamber 34 as a pressure fluid balancing chamber 46 at the right end of the motor rotor 39. The chamber 46 is thus available for controlled pressure to bias the shaft 38 in opposition to the thrust transferred to the shaft 38 by the impeller 39.

The fluid impeller 39 is provided with return fluid passageways 47 at the suction portion thereof and can have a rim 48 in relatively closely spaced running relation to a rim 49 on the end plate 16 to prevent appreciable fluid flow at this location.

The mode of operation will now be pointed out.

Upon energization of the windings 29 a rotating field is set up in the stator laminations 28 and the motor rotor 39 is caused to rotate. Rotation of the motor rotor 39 effects rotation of the shaft 38 and the fluid impeller 37 carried thereby. Fluid supplied through the inlet connection 11 is delivered by the fluid impeller 37 to the outer portion of the impeller chamber 12 and to the scroll 13 for delivery through the fluid connection 14. The fluid impeller 37, in operation, imparts a longitudinal axial thrust to the shaft 38.

Upon rotation of the fluid impeller 37 fluid is supplied from the impeller chamber 12 through the ports 36 to the motor rotor chamber 34. A portion of the fluid entering the chamber 34 passes to and along the bearing 33 and through the clearance between the shaft 38 and the bore 19. Another and major portion of the fluid entering the chamber 34 passes axially through the fixed orifice 42 between the motor rotor 39 and the sleeve 25 to the pressure fluid balancing chamber 46, then through and along the bearing 32, to the chamber 44, then along the passageway 43 to and through the openings 45 and to the variable orifice 58 between the rim 55 and the face 57.

Upon delivery from the orifice 58 the fluid passes through the return passageways 47 to the suction side of the impeller 37.

The pressure balancing chamber 46 has the pressure therein as determined by fixed orifice 42 and the variable orifice 58 at the rim 55 and face 57, the discharge of fluid therefrom being controlled by the size of the variable orifice 58. If the clearance at the variable orifice 58 is caused to decrease, then the pressure in the chamber 46 tends to increase, and move the motor rotor 39 along its longitudinal axis to the left (FIG. 1) to increase the size of the variable orifice 58 and permit more rapid discharge and pressure drop in the chamber 46, with axial movement of the motor rotor 39 in conformity with the forces thereon including those effective in the chamber 46. If the pressure in the chamber 46 tends to decrease then the effect of the forces on the motor rotor 39 is to tend to move the motor rotor 39 along its longitudinal axis to decrease the size of the variable orifice 58 with pressure build up. A pressure balancing action is thus provided at the chamber 46 to accommodate the thrust of the impeller 37 and with a variable orifice 58 between the impeller 37 and a fixed member perpendicular to the shaft at the plate 16. The balancing action reduces or even eliminates the necessity for end wear rings or end bearings at the bearing rings 33. The balancing action is independent of the pumping action by the impeller 37.

The balancing or positioning of the motor rotor 39 and thereby of the shaft 38 and impeller 37 by the pressures effective in the chamber 46 tends to assure the retention of the motor rotor 39 at an equilibrium or balanced condition, with a minimum of movement required to restore the equilibrium and balanced condition. The fluid circulating through the bearing passageways and between the bearing rings 33 and the shaft 38 is effective for cooling and for lubricating the contacting surfaces, while at the same time the fluid in the motor rotor chamber 36 and the portion thereof which serves as the balancing chamber 46 acts as a cushion and prevents abrasion of the end plates 41.

I claim:

1. In a motor driven pump, a pump housing having an impeller chamber with an impeller therein, a motor housing extending from said pump housing and having an interior sleeve providing a motor stator chamber, a motor stator in said motor stator chamber, the interior of said sleeve providing a motor rotor chamber, a motor rotor in said motor rotor chamber having a peripheral portion with clearance with respect to said sleeve to provide a fixed orifice and having an end face portion at its end remote from the impeller, a shaft in said motor and pump housings on which said motor rotor and said impeller are mounted, end members in said sleeve at the ends thereof, said motor rotor chamber at one end being in communication with said impeller chamber for the delivery of fluid to said motor rotor chamber, said end members having a bearing for said shaft, the space between one of said end members and said end face portion providing a pressure balancing chamber with a force exerted on said end face by the pressure in said chamber in opposition to an axial force exerted by said impeller, said pressure balancing chamber having said fixed orifice in communication therewith, said shaft having a fluid passageway therealong in communication at one end with said pressure balancing chamber, said shaft having a discharge opening connected to said fluid passageway, and relatively movable portions on said impeller and in said pump housing providing there between a variable orifice for controlling the pressure conditions in said pressure balancing chamber, said impeller having a return passageway with which said variable orifice is in communication.

2. A motor driven pump as defined in claim 1 in one of said last portions is a face of said impeller.

3. A motor driven pump as defined in claim 1 in which one of said last portions is in fixed relation to said motor housing.

4. A motor driven pump as defined in claim 1 in which one of said last portions is on a face of one of said end members.

5. A motor driven pump as defined in claim 1 in which one of said last portions is an axially extending rim on one of said end members.

6. A motor driven pump as defined in claim 1 in which one of said last portions is a face of said impeller and the other of said portions is an axially extending rim on one of said end members.

7. In a motor driven pump, a pump housing having an impeller chamber with an impeller therein, a motor housing extending from said pump housing and having an interior sleeve providing a motor stator chamber, a motor stator in said motor stator chamber, the interior of said sleeve providing a motor rotor chamber, a motor rotor in said motor rotor chamber having a peripheral portion with clearance with respect to said sleeve to provide a fixed orifice and having an end face portion at its end remote from the impeller, a shaft in said motor and pump housings on which said motor rotor and said impeller are mounted, end members in said sleeve at the ends thereof, said motor rotor chamber at one end being in communication with said impeller chamber through an opening in one of said end members for the delivery of fluid to said motor rotor chamber, said end members having bearings for said shaft with fluid passageways therealong, the space between one of said end members and said end face portion providing a pressure balancing chamber with a force exerted on said end face by the pressure in said chamber in opposition to an axial force exerted by said impeller, said pressure balancing chamber having said fixed orifice in communication therewith, said shaft having a fluid passageway therealong in communication at one end with said pressure balancing chamber through the passageways in one of said bearings, said shaft having a discharge opening connected to said fluid passageway, and means providing a variable orifice for controlling the pressure conditions in said pressure balancing chamber, said means including a radially disposed face portion radially disposed on said impeller and a contiguous face portion on said end member with respect to which said first face portion is movable upon longitudinal axial movement of said shaft, said impeller having a return passageway with which said variable orifice is in communication.

References Cited by the Examiner
UNITED STATES PATENTS

| | | | |
|---|---|---|---|
| 3,031,973 | 5/1962 | Kramer | 103—87 |
| 3,053,189 | 9/1962 | White | 103—87 |
| 3,138,105 | 6/1964 | White | 103—87 |

ROBERT M. WALKER, *Primary Examiner.*